June 13, 1961 G. E. KNAUSENBERGER 2,988,638

VARIABLE IMPEDANCE UNIT

Filed Nov. 12, 1958

INVENTOR
GEORG E. KNAUSENBERGER
BY Mitchell & Bechert
ATTORNEYS

United States Patent Office 2,988,638

Patented June 13, 1961

2,988,638

VARIABLE IMPEDANCE UNIT

Georg E. Knausenberger, State College, Pa., assignor, by mesne assignments, to HRB-Singer, Inc., State College, Pa., a corporation of Delaware Filed Nov. 12, 1958, Ser. No. 773,354
3 Claims. (Cl. 250—40)

This invention relates to an impedance element comprising an inductor and a capacitor, and more particularly to such element wherein the electrodes of the capacitor and the winding of the inductor comprise foil-type elements.

More specifically, the invention relates to a combined capacitor-inductor reactor wherein one foil element constitutes both the inductor and one electrode of the capacitor.

In electronics, and particularly in the field of radio communication, tunable tank circuits are used extensively. Conventionally, tuning is accomplished by varying either the inductor or, more usually, the capacitor of the tank circuit. Tuning by varying only one of the two reactors has been accepted as a compromise solution where wide range tuning is desired. Although single element tuning has the desirable feature of tuning by adjustment of a single drive shaft, it inherently imposes a restriction on the tuning range. Conventionally, the tuning range is increased by switching in another and usually larger capacitor.

Combined reactor-capacitor elements are known wherein the inner or outer electrode of the capacitor is in the form of a winding and serves the dual function of a capacitor electrode and inductor. In this device, turns of wire are unwound until the desired capacitance and inductance are obtained. The unwanted wire is cut-away and the impedance component is connected into circuit exhibiting a fixed predetermined impedance. Although this impedance component provides both inductance and capacitance in a unitary circuit element, it is not variable, and by reason of its construction, does not lend itself to adjustment.

Considerable effort, therefore, has been expended in the search for a simple, unitary tunable element which exhibits both inductance and capacitance and both of which reactances may be simultaneously adjusted.

Accordingly, it is a primary object of this invention to provide such an element.

It is a further object of this invention to provide a tunable element in which the Q and resonant frequency thereof are adjustable by rotation of a single shaft.

It is still a further object of this invention to provide a variable impedance unit wherein a metal foil serves as an inductance winding and as an electrode of a capacitor, and including driving means for selectively increasing or decreasing the number of turns of the foil on the carrier therefor.

In accordance with an aspect of the invention, there is provided a cylindrical carrier for a variable capacitor and a variable inductor. One electrode of the capacitor comprises conductive material on the surface of the cylindrical carrier. The second electrode of the capacitor is formed by an insulated metal tape helically wound on the surface of the cylinder. The metal tape serves also as the inductor of the combination circuit element. The invention is characterized by forming the metal tape on a roller and mounting the roller so that its axis is alongside the axis of the cylinder, whereby the tape may be fed off the roller circumferentially onto the cylinder. Driving means are provided for rotating the cylinder and for moving the roller axially relative to the cylinder, whereby the tape may be wrapped a selected number of helical turns around the cylinder; the number of turns determining simultaneously the inductance and capacitance of the element.

The above-mentioned and other features and objects of this invention and the manner of attaining them will become more apparent and the invention itself will be best understood by reference to the following description of an embodiment of the invention taken in conjunction with the accompanying drawing, wherein.

Figures 1, 2:
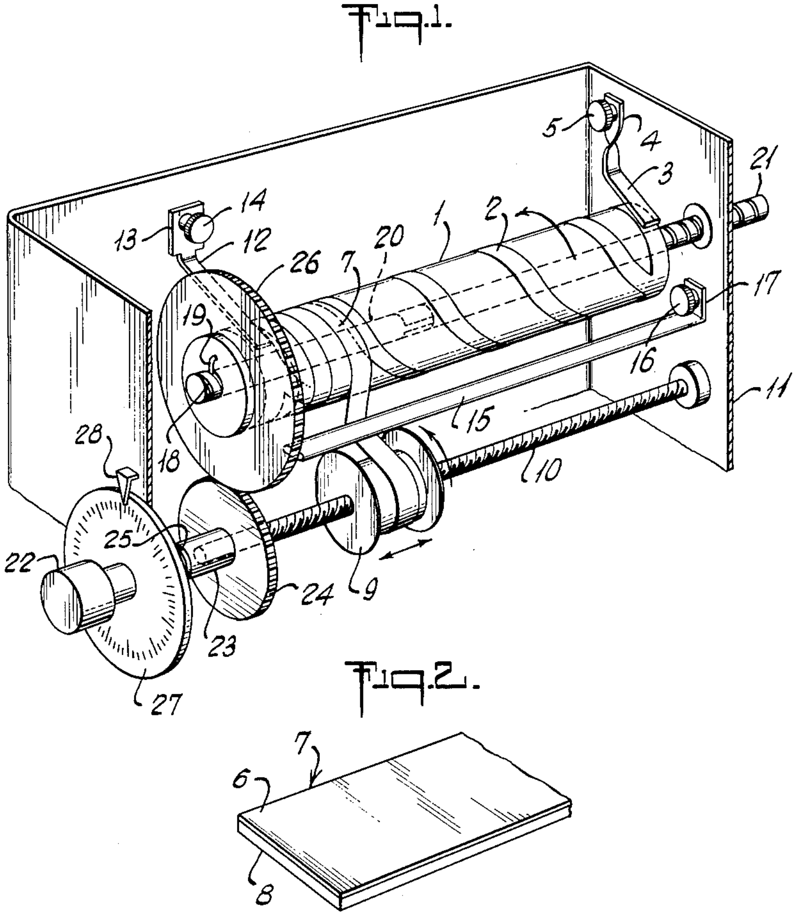
FIGURE 1 is a perspective view of an embodiment of the variable impedance circuit element.
FIGURE 2 is a perspective view of a portion of the metal tape serving as one electrode of the capacitor.

Referring to FIGURE 1, the variable impedance circuit element comprises an insulated cylinder 1, which may be made of any suitable insulating material, such as a plastic, having formed on the surface thereof a helical metal band. At one end of the cylinder, for example, the right-hand end, the band 2, is formed circularly to serve as a running surface for a wiper finger 3. The wiper finger 3 is part of, or connected to, a terminal member 4. A binding post 5 for a wire is screwed into the terminal member 4.

The metal band 2 may be in the form of a metal foil wound on and bonded to the surface of the cylinder 1. Preferably, however, the metal band 2 is printed on the surface of the cylinder.

The metal band 2 constitutes one electrode of the capacitor.

The other electrode of the capacitor consists of a metal foil 6 which constitutes one layer of a multilayer tape 7, shown more specifically in FIGURE 2. The metal foil 6, shown by heavy line in FIGURE 2, occupies one side of the tape and an insulated layer 8 occupies the opposite side of the tape. The insulated layer 8 may comprise a polyethylene film and may also contain ferromagnetic material.

The metal tape 7 is carried by a roller 9, which is rotatably mounted on a fixed lead screw 10, secured to a frame 11. The roller 9 is disposed or shaped so that the tape is taken off smoothly to form a helix around the circumference of the cylinder 1. As shown, the roller 9 is provided with a tapped boring parallel to the axis of the cylinder 1. The axis of the roller, however, is askew to the cylindrical axis to permit helical winding of the foil on the cylinder. The tape 7 may, for example, be spring-wound on the roller 9; the spring tension being in a direction to maintain the tape wound on the roller 9. The tension, of course, is sufficiently light so that when the tape is wound on the cylinder 1, it is not unduly stressed.

The end of the tape 7 is fastened by any suitable means to the cylinder 1, preferably at one end of the cylinder, e.g., the left-hand end in the illustration, and the tape is oriented so that the insulated layer 8 rests on the metal band 2. The tape is wrapped circularly around the left-hand end and the circular winding is fixed to serve as a running surface for a wiper finger 12. The terminal end 13 of the finger is secured to a side of the frame 11 and a binding post 14 is screwed into the terminal 13. It can be readily seen, therefore, that as the cylinder 1 is rotated, for example in the direction of the arrow, the roller 9 is similarly rotated and the tape 7 is caused to wrap around the circumference of the cylinder 1. As the roller 9 rotates, it moves axially on the lead screw 7 relative to the cylinder 1 so that the tape 7 defines a helix on the surface of the cylinder. The pitch of the helix is a function of the lead screw thread pitch and the direction of the roller travel is a function of the direction of thread, i.e., right-hand or left-hand. As shown, the thread is of the left-hand type so that as the roller rotates counterclockwise, the roller moves axially towards the frame 11.

Thus, the capacity of the circuit element is determined by the axial length of the metal band 2, covered by the tape 7.

The inductance of the circuit element is a function of the number of turns of the helically wound tape 7 on the cylinder. One terminal of the inductance is at 13. The other terminal is formed by an elongated wiper finger 15 mounted on the frame 11 to bear against the metal foil portion 6 of the tape 7. A binding post 16, for a wire, is screwed into the terminal end 17 of the wiper finger 15.

Thus, the tape 7 serves the dual function as an electrode of the capacitor and as the winding of the inductance. By varying the number of turns of the tape 7, both the inductance and capacitance of the unit are simultaneously varied.

In accordance with a more limited aspect of the invention, a magnetic core piece 18, of varying permeability from one end to the other, is axially and slidably mounted within the cylinder 1. The core piece 18 is preferably provided with grooves on the surface thereof, which cooperate with a rider pin 19, which rides in the grooves. Thus, by rotating the core 18, the core is moved axially within the cylinder 1. The variation in permeability may be accomplished simply by forming the core in two parts, as suggested in FIGURE 1. One half of the core, e.g., 20, may consist of a homogeneous ferrite, and the other half 21 may consist of copper or other non-magnetic material. Alternately, the core 18 may consist of a ferrite having gradually varying permeability from one end to the other. In either case, the inductance of the circuit element may be varied by selectively adjusting the position of the core within the cylinder 1.

In accordance with another aspect of the invention, both the inductance and capacitance of the circuit element are varied simultaneously by means of a single knob control 22.

The knob 22 is attached to a shaft 23 for driving a gear 24. The shaft 23 is counter-bored at one end for freely accommodating the lead screw 10, whereby the shaft, although supporting one end of the lead screw 10, is free to rotate therearound. The knob, shaft and gear assembly may be maintained against axial displacement by, for example, grooving the shaft as at 25 and mounting the grooved portion in a U shape opening in the frame, not shown.

The gear 24 drives a second gear 26 attached to the cylinder 1. Thus, rotation of the knob 22 drives the cylinder 1, over shaft 23 and gears 24 and 26. The rotation of the cylinder 1 causes the tape 7 to wrap itself around the cylinder, and the tape being drawn off the roller 9 causes the roller to rotate and to move axially along the stationary lead screw 10. The tape, therefore, is wrapped helically around the cylinder.

As the knob 22 is moved clockwise, thereby moving the roller 9 axially to the left in the illustration, the tape is taken-up by the roller 9 as a result of the roller being under spring tension, as previously explained.

The capacitance and inductance for a given core position may easily be predetermined by mathematical analysis. Accordingly, a calibrated dial 27 is provided to give the impedance value for any shaft position. The dial 27 is attached to the shaft 23 and moves directly therewith. An indicia indicator 28 is suitably mounted, for example, to the frame 11, so as to remain relatively stationary, and is positioned to indicate precisely the value of the impedance selected by rotation of the knob 22.

The particular driving mechanism illustrated is only by way of example, and many other forms may be envisaged by one skilled in the art.

Figure 3:
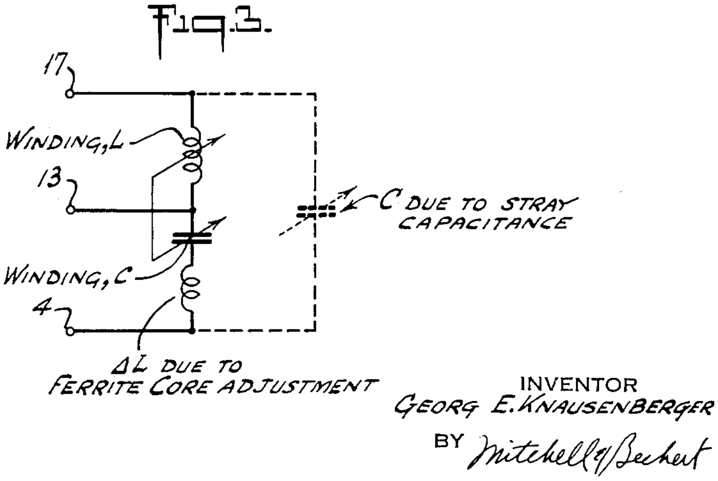
FIGURE 3 is the equivalent circuit diagram of the impedance unit shown in FIGURE 1.

The equivalent electrical diagram is shown in FIGURE 3, the terminals 4, 13 and 17 corresponding to those shown in FIGURE 1. For series connection of the capacitor and inductor, connections are made to terminals 4 and 17. For parallel connection, terminals 4 and 17 are connected together and constitute one output connection and terminal 13 the other output connection.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A combination variable capacitor and variable inductor element, comprising a hollow cylinder rotatable about its axis, a printed helical conductive band on the surface of said cylinder constituting a first electrode of said capacitor, a strip of metal tape insulated on one side thereof and mounted on a roller, means for mounting said roller so that the tape feeds-off said roller circumferentially onto said cylinder, the tape being oriented so that the insulated side rests on said cylinder, one end of said tape being attached to said cylinder, selectively operable driving means connected to said cylinder for rotating said cylinder and for moving said roller axially relative to said cylinder, whereby said tape is wrapped helically around said cylinder, the wound tape constituting said inductor and the second electrode of said capacitor, and an axially movable magnetic core of varying permeability along its length within said cylinder, whereby the inductance of said combination is a function of the number of turns of said tape around said cylinder and the position of said magnetic core in said cylinder.

2. A combination variable capacitor and variable inductor element, comprising a cylinder rotatable about its axis, conductive material comprising a printed helical band circularly disposed around the circumferential surface of said cylinder at one end thereof constituting a first electrode of said capacitor, a wiper finger continuously contacting the circularly disposed surface and constituting a first output terminal, a strip of metal tape insulated on one side thereof and mounted on a roller, means for mounting said roller so that the tape feeds-off said roller circumferentially onto said cylinder, the tape being oriented so that the insulated side rests on said cylinder, one end of said tape being attached to said cylinder, selectively operable driving means connected to said cylinder for rotating said cylinder and for moving said roller axially to said cylinder, whereby said tape is wrapped helically around said cylinder, the wound tape constituting said inductor and the second electrode of said capacitor, said metal tape being circularly disposed about one end of said cylinder, a second wiper finger continuously contacting said circularly arranged tape and constituting a second terminal, and a third wiper finger mounted between said roller and said cylinder and contacting said metal tape as the tape is being applied to said cylinder and constituting a third terminal.

3. The combination according to claim 1, and further comprising a single shaft for operating said selectively operable driving means, whereby rotation of said single shaft produces a variation of both inductance and capacitance simultaneously.

References Cited in the file of this patent

UNITED STATES PATENTS

| | | |
|---|---|---|
| 1,081,271 | Fessenden | Dec. 2, 1913 |
| 1,642,488 | Clausen | Sept. 13, 1927 |
| 1,936,671 | Hurt | Nov. 28, 1933 |
| 1,980,713 | Benson | Nov. 13, 1934 |
| 2,532,051 | Behringer | Nov. 28, 1950 |
| 2,666,905 | Gerlach | Jan. 19, 1954 |